(12) United States Patent
Cory et al.

(10) Patent No.: US 8,555,324 B2
(45) Date of Patent: Oct. 8, 2013

(54) VIDEO DOWNLOAD MECHANISM FOR TRANSFERRING LARGE DATA

(75) Inventors: Daniel P. Cory, Seattle, WA (US); John A. Bocharov, Seattle, WA (US); Thomas D. Taylor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 12/699,034

(22) Filed: Feb. 2, 2010

(65) Prior Publication Data

US 2011/0191812 A1    Aug. 4, 2011

(51) Int. Cl.
*H04N 7/173* (2011.01)

(52) U.S. Cl.
USPC .............. 725/93; 725/51; 725/54; 725/86; 725/92; 725/109

(58) Field of Classification Search
USPC .............. 725/51, 54, 86, 90, 92, 93
See application file for complete search history.

(56) References Cited

U.S. PATENT DOCUMENTS

| | | | |
|---|---|---|---|
| 6,233,282 B1 | 5/2001 | Guerrera | |
| 6,326,984 B1 | 12/2001 | Chow et al. | |
| 7,433,524 B2 | 10/2008 | Yamaguchi et al. | |
| 2007/0172133 A1 | 7/2007 | Kim et al. | |
| 2007/0250901 A1 * | 10/2007 | McIntire et al. | 725/146 |
| 2008/0292216 A1 | 11/2008 | Walker et al. | |
| 2009/0080698 A1 * | 3/2009 | Mihara et al. | 382/103 |
| 2009/0222329 A1 * | 9/2009 | Ramer et al. | 705/10 |

FOREIGN PATENT DOCUMENTS

WO    2008127676 A2    10/2008

OTHER PUBLICATIONS

"Expression Blend and Design", Retrieved at <<http://blogs.msdn.com/expression/archive/2009/07/22/deep-zoom-composer-re-leased.aspx Support for Smooth Streaming>>, Jul. 22, 2009, pp. 11.
Carr, Damon Wilder, "Live Smooth Streaming", Retrieved at <<http://team.pushbomb.com/category/hd-video/live-smooth-streaming/feed/>>, Aug. 5, 2009, pp. 9.
"Microsoft AJAX CDN: What is it and why you should know about it", Retrieved at <<http://discountaspnet.spaces.live.com/blog/>>, Sep. 18, 2009, pp. 14.
"A Deep Zoom Blog", Retrieved at <<http://blogs.msdn.com/lutzg/>>, Jul. 30, 2009, pp. 18.
Zambelli, Alex, "T43F: Silverlight Media End-to-End", Retrieved at mschannel9.vo.msecnd.net/o9/mix/09/pptx/t43f.pptx>>, Sep. 23, 2009, pp. 50.

* cited by examiner

*Primary Examiner* — Kieu Oanh T Bui

(57) ABSTRACT

A content delivery system stores large content as frames of video that can be served by content servers already optimized for streaming video. Instead of storing image tiles in separate files, the system treats each tile as a frame of a video and stores the tiles in a video format. This allows transfer of large data from a publisher to a content server by transferring a single file or a small handful of files (rather than thousands or millions of files). Web servers such as MICROSOFT Internet Information Server (IIS) include smooth streaming support that can return individual images as video frames as though the images were stored in separate files. Thus, the content delivery system provides easier management of large data for publishers while continuing to provide a smooth experience consuming the data for clients.

20 Claims, 5 Drawing Sheets

VIDEO DOWNLOAD MECHANISM FOR TRANSFERRING LARGE DATA

BACKGROUND

The Internet contains many types of downloadable media content items, including audio, video, documents, and so forth. These content items are often very large, such as video in the hundreds of megabytes. Users often retrieve documents over the Internet using Hypertext Transfer Protocol (HTTP) through a web browser. One type of large data includes very large images. Although many computer users are familiar with relatively small images taken by a digital camera, large images are becoming more useful. For example, websites such as MICROSOFT VIRTUAL EARTH and TerraServer pioneered making satellite imagery of the Earth available to web users. Because users can zoom anywhere from the whole planet down to a single house, this imagery can include thousands of separate tiled images as well as multiple zoom levels and resolutions. Even digital camera images are becoming larger (e.g., 10-20 megapixel) than what can easily be viewed on a computer screen all at once.

Large images are frequently stored in a tiled format, with each part of the image stored in a separate file. Deploying millions of files for a large set of large images is too slow and in some cases prevents projects from ever completing. Previous solutions store each part of the image in a separate file. Deploying these files to the public server may take months for certain large projects. Project administrators have trouble managing the thousands or millions of files created when generating such content. Moving them around from disk to disk can be very time consuming. Even worse, when it is time to publish the content to a Content Delivery Network (CDN), such as Limelight or Akamai, the CDNs use File Transfer Protocol (FTP) to copy the files. FTP is incredibly slow for dealing with many small files.

Several solutions have been tried for handling these problems, and have failed or have significant drawbacks. One solution utilizes HTTP byte range requests to retrieve an appropriate portion of content from a binary container of the many image files. Unfortunately, CDNs do not optimize byte range requests. Another solution is to zip files (i.e., compress many files into a single package file) for transfer from an origin to the server, but many CDNs do not allow sufficient access to their servers to unzip the content at the destination so that the content can be accessed by clients. There are server modules that allow leaving the content as a zip file and accessing the relevant portions upon request, but many CDNs will not install such modules on their servers. In addition, since the ZIP container indexes by string instead of integer, there is a small amount of extra overhead. Another solution leverages the CDN's custom origin model and hosts the content on the publisher's server, with the CDN acting as a pure cache. The previous solutions can then be used on the publisher's server. However, this is not popular with CDN customers because it means the publisher's server has to be fully reliable. CDN customers would usually prefer to push content to the CDN and be done.

SUMMARY

A content delivery system is described herein that stores large content as frames of video that can be served by content servers already optimized for streaming video. Instead of storing image tiles in separate files, the system treats each tile as a frame of a video and stores the tiles in a video format. This allows transfer of large data from a publisher to a content server by transferring a single file or a small handful of files (rather than thousands or millions of files). Web servers such as MICROSOFT Internet Information Server (IIS) include smooth streaming support that can return individual images as video frames as though the images were stored in separate files. There are two phases typically performed by the content delivery system, the first phase includes populating a server with large content for streaming to a client, and the second phase includes a client accessing the content. Thus, the content delivery system provides easier management of large data for publishers while continuing to provide a smooth experience consuming the data for clients.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
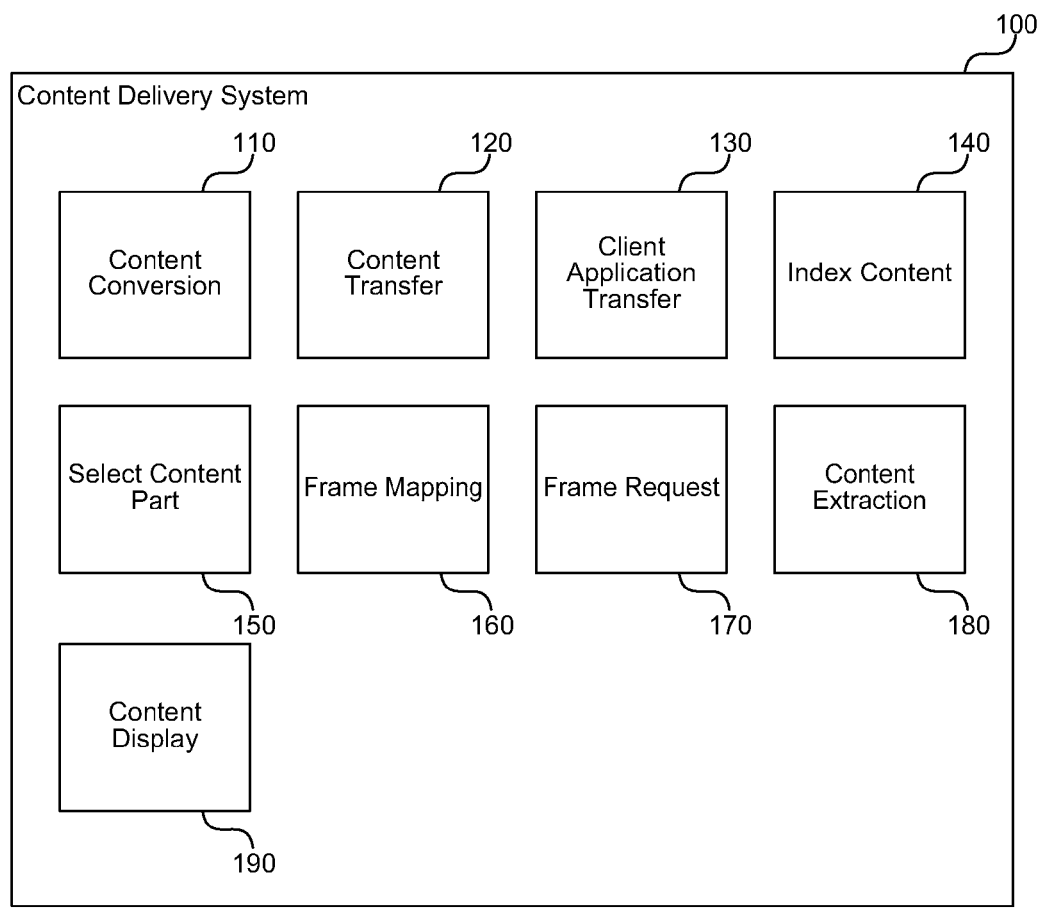
FIG. 1 is a block diagram that illustrates components of the content delivery system, in one embodiment.

A content delivery system is described herein that stores large content as frames of video that can be served by content servers already optimized for streaming video. Instead of storing image tiles in separate files, the system treats each tile as a frame of a video and stores the tiles in a video format. This allows transfer of large data from a publisher to a content server by transferring a single file or a small handful of files (rather than thousands or millions of files). For example, the system may provide each zoom level of an image as a separate video file. Web servers such as MICROSOFT Internet Information Server (IIS) include smooth streaming support that can return individual images as video frames as though the images were stored in separate files. There are two phases typically performed by the content delivery system, the first phase includes populating a server with large content for streaming to a client, and the second phase includes a client accessing the content. During the first phase, a content publisher converts existing large content data into a format recognized by a content server. For example, a content publisher may use tools provided by the system to convert thousands of image tiles into a single file that resembles frames of video. Then, the content publisher transfers the converted file to a content server for responding to user requests. The content publisher may also provide instructions (e.g., in the form of a manifest describing the content) to the content server that helps clients to consume the content.

During the second phase, a client determines the overall layout of the large content data. For example, the client may receive an initial manifest describing the content and determine an initial zoom level of the content to display. The client determines an initial image tile to display, and maps the determined tile to a frame within the converted file previously uploaded to the content server by the content publisher. The client sends a request to retrieve the mapped frame from the content server, and receives the requested frame (from either the content server or a cache between the client and content server). The client unboxes the received frame to extract an image tile packaged within the frame. Thus, the content delivery system provides easier management of large data for publishers while continuing to provide a smooth experience consuming the data for clients.

Although many types of video streaming can be used with the system described herein, one example is smooth streaming. Smooth streaming is a technology of MICROSOFT IIS 7 for efficiently downloading video in small bursts from a CDN to a client over an HTTP-based protocol. Deep Zoom (or Seadragon) is a technology for downloading arbitrary portions and sizes of large images or collections of images to a client over an HTTP-based protocol. The system described herein hosts Deep Zoom types of content on a smooth streaming server or other streaming server. The system accelerates deployment of large content to the CDN by reducing the number of files needed to deploy the content on the CDN's server(s). The content is created with existing tools and wrapped in the fragmented MP4 or other boxed format supported by smooth streaming. For images, the system maps image concepts like resolution, X-position, and Y-position used by image tools like Deep Zoom to smooth streaming concepts like quality and time position used by video tools like smooth streaming. Once the content is deployed to a supported server, a Deep Zoom client can read the data (or portions of the data) from the server and reassemble requested portions of the original image on the client.

Smooth streaming allows for putting an entire Deep Zoom image or the thumbnail pages for a Deep Zoom collection in a single file per level. The files are published to the CDN as usual. As long as the CDN supports smooth streaming or a similar streaming technology, the smooth streaming extension can pull out one tile at a time based on client requests. The system is much more appealing to content publishers than previous solutions because many CDNs already support MICROSOFT IIS smooth streaming. CDNs are very unlikely to accept any other extensions to their servers without a major business case, so the ability to use an existing technology is very helpful. In addition, MICROSOFT IIS has built the smooth streaming extension and worked hard to optimize central processing unit (CPU) usage and other resource usage for multiple contemporaneous users watching streaming video. This allows the content delivery system to benefit from scalability for large data already natively handled by smooth streaming.

Unlike earlier streaming technologies that tightly couple the client to the server with a stateful connection for each client that the server maintained, smooth streaming provides a stateless protocol between the client and server in which the server embeds incremental information in media fragments that eliminates the usage of a typical control channel. In addition, the server provides uniform media fragment responses to media fragment requests, thereby allowing existing Internet cache infrastructure to cache streaming media data. Smooth streaming receives media data in fragments from one or more sources, creates or receives an index of each fragment, and stores the fragments. The server then provides fragments requested by clients. Each fragment contains metadata information that describes the encodings available on the server and the encoding of the fragment in addition to the media content of the fragment for playback by the client. The server may provide fragments in multiple encodings so that the client, for example, can switch quickly to fragments of a different bit rate or playback speed based on network conditions. These video concepts map nicely to those used for large image data. Video bit rate can be mapped to image resolution (e.g., zoom level), and X/Y position can be mapped to the timeline of a video. For example, an image can be mapped to video frame time by starting at the upper left corner of the image and working left to right giving each image tile the next available video time, and moving to the next row upon reaching the right edge of the image. Because fragments can be cached by existing Internet cache infrastructure, clients will receive media with lower latency from a cache server local to the client if the requested media is available in the cache (such as if a client has previously requested the same media).

Smooth streaming in particular uses a particular file structure for sending media fragments to clients, though other formats can be used. The client requests fragments of media from a server that include a portion of the media. For example, for a 10-minute file, the client may request 1-second fragments. For image data mapped to video files, individual tiles may represent 1-second fragments of video, and the 10-minute file may represent all of the tiles of a large image. Note that unlike typical streaming where the server pushes data to the client, in this case the client pulls media fragments from the server. Each fragment contains metadata and media content. The metadata may describe useful information about the media content, such as the bit rate at which the media content was encoded (or zoom level in the case of image data), where the media content fits into a larger media element (e.g., this fragment represents offset 1:10 in a 10 minute video clip), the codec used to encode the media content, and so forth. The client uses this information to place the fragment into a storyboard (e.g., a manifest) of the larger media element and to properly decode and playback the media content. For image data, this means that the client receives information that tells the client where a particular tile fits into a larger image. When a user is viewing a map, the user may request only a small number of tiles of the overall image (for example, the user may zoom in to view his own house in an aerial photograph), and the system allows the client to retrieve only the requested tiles.

FIG. 1 is a block diagram that illustrates components of the content delivery system, in one embodiment. The system 100 includes a content conversion component 110, a content transfer component 120, a client application transfer component 130, index content component 140, a select content part component 150, a frame mapping component 160, a frame request component 170, a content extraction component 180, and a content display component 190. Each of these components is described in further detail herein. Although described as one system, the components herein may operate at different locations on different computer hardware. As one example, the content conversion component 110 and content transfer component 120 may operate at a content publisher's site, while the other components may operate on various web clients. Those of ordinary skill in the art will recognize many useful variations for distributing the functionality described herein.

The content conversion component 110 converts large content elements into a video file format for streaming to clients. For example, for image tiles that make up a large image, the content conversion component 110 converts each image tile to a video frame based on the image tile's position within the large image. For a square image, the upper left image tile may represent the first frame of video while the lower right tile represents the last frame of video. The size of the image (length multiplied by width or other formula) determines the length of the video produced by the conversion. The content publisher may invoke the content conversion component 110 for several sets of image tiles, each representing a different zoom level or resolution of the large image. For example, a coarsest zoom level may include a single image thumbnail for the entire large image, while the finest zoom level may include millions of image tiles each containing high-resolution portions of the large image.

The content transfer component 120 transfers one or more converted video files from the content publisher to a content server. Although the content may have initially included thousands or millions of image tiles, the transfer only involves transferring a handful of video files (e.g., 16 for each of 16 zoom levels). The content transfer component 120 may invoke existing content transfer protocols, such as FTP, HTTP, and so forth. For most protocols, there is substantial overhead in setting up for and concluding each file transfer, so the system can substantially reduce the time needed to transfer content based on the reduced number of files transferred. The content publisher may also provide instructions (e.g., in the form of a manifest describing the content) to the content server that helps clients to consume the content. For example, the manifest may detail the total number of image tiles in each zoom level and provide video times used to access each tile. Alternatively or additionally, the manifest may include information, such as the original large image width and height, which allows the client to automatically determine a video time that maps to a particular position within the image without transferring the specific time associated with each image tile.

In some embodiments, the system includes a client application transfer component 130 that uploads a client application to a content server for clients to retrieve. Because the system 100 leverages a specialized format for serving large content, the client may use processing designed to retrieve and extract the large content from the specialized format. It is typical for web-based technologies to work correctly for any client with a web browser, regardless of software installed on the client system. Thus, clients may expect a web server to be capable of serving any logic needed to consume the content that the web server provides. In the case of the present system, the client logic can be implemented as a MICROSOFT SILVERLIGHT or Adobe Flash application that can be downloaded by the client from the content server. The client application then knows how to request and interpret the content received from the content server to display the content to the user of the client.

The index content component 140 builds a client-side index that describes the large content element to which received content parts belong. The index may be represented as a table, such as in the case of a tiled image. This allows the client to retrieve content parts relative to the user without retrieving the entire large content element. For example, a user viewing a very high-resolution photograph (e.g., a picture of the employees of a 50,000-employee corporation) may only want to zoom into a small portion of the photograph (e.g., the part of the picture that the user is in). The content index allows the system 100 to determine which content part maps to a particular area of the large content element.

The select content part component 150 receives a selection of a particular content part within the large content element. For example, for a large content element with multiple zoom levels, each content part at one zoom level may map to four content parts at the next zoom level. Thus, when the user clicks on a quadrant of a content part at the current level, the select content part component 150 may identify the quadrant and select a corresponding content part at the next zoom level to request and display next. The component 150 may also select an initial content part to display in a response to a user first opening a web application utilizing the system 100. For example, the component 150 may initially select a zoom level with a single content part or may select a centered content part at a high zoom level of a large data element.

The frame mapping component 160 maps the selected content part to a corresponding video frame within the converted large content element. For example, the system may determine that a content part representing an image tile at a given X and Y coordinate position maps to a time T in a video representation of the large content element to which the image tile belongs. The content server believes the content it is providing is a video file and expects requests to address video files by well-understood video concepts such as an absolute time or a frame number. Thus, the system 100 converts from its own content domain to the video domain to which the content was previously converted.

Figure 2:
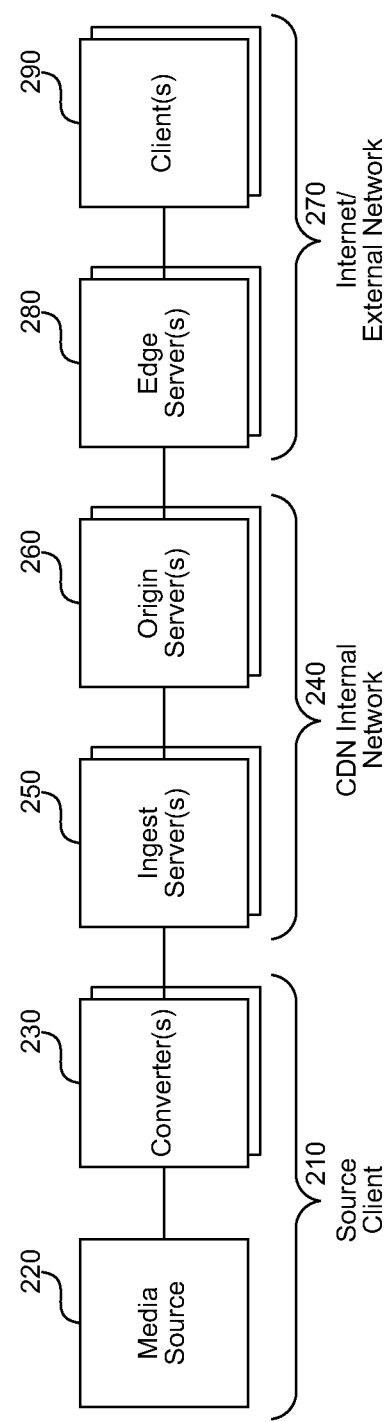
FIG. 2 is a block diagram that illustrates an operating environment of the content delivery system, in one embodiment.

The frame request component 170 makes requests from the client for individual content parts in the form of video frames from a content server. As shown in FIG. 2, the client's request may pass first to an edge server (e.g., an Internet cache), then to an origin server, and then to an ingest server. At each stage, if the requested data is found, then the request does not go to the next level. For example, if the edge server has the requested data, then the client receives the data from the edge server and the origin server does not receive the request. Each frame may have a Uniform Resource Locator (URL) that individually identifies the frame. Internet cache servers are good at caching server responses to specific URL requests (e.g., HTTP GET). Thus, when the first client calls through to the server to get a frame, the edge servers cache that frame and subsequent clients that request the same frame may receive the frame from the edge server (based on the cache lifetime and server time to live (TTL) settings). The frame request component 170 receives the frame and passes it to the content extraction component 180 for interpretation.

The content extraction component 180 interprets the format of a video frame received by the frame request component 170 and separates the frame into its component parts. Typically, the frame includes a header portion containing metadata, and a data portion containing media content. The content extraction component 180 provides the metadata to the index content component 140 and the media content to the content display component 190. The media content may be stored in a container format, such as an MP4 box. The server and client are not concerned with what is in the container and simply pass the container as is from server to client. Once received at the client, however, the system 100 described herein can unbox the container format to retrieve the data put into the container during the conversion process described herein. For example, for a large image, the content of each box may include a single image tile (or set of image tiles). In some embodiments, a client using the system 100 invokes a server URL that provides the contents of the frame in an unboxed format (e.g., "http://www.server.com/image.ism/QualityLevels(111)/RawFragments(tile=1)"). This frees the client from performing the unboxing and saves bandwidth by not sending unnecessary header information.

The content display component 190 displays received media content using the client hardware. The content display component 190 may invoke one or more codecs or decoders to interpret the media content (e.g., a JPG image decoder) and to decompress or otherwise decode the media content from a compressed format to a raw format (e.g., YV12, RGBA, or PCM audio samples) ready for playback. The content display component 190 may then provide the raw format media content to an operating system API (e.g., MICROSOFT DirectX) for playback on local computer system sound and video hardware, such as a display and speakers. In the case of image data, the component 190 receives potentially compressed image data (e.g., PNG or JPG), provides the image data to a decoder (e.g., a JPG decoder) that converts the compressed image data to bitmap image data, and then displays the bitmap image data using operating system APIs for displaying images.

The computing device on which the content delivery system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a block diagram that illustrates an operating environment of the content delivery system, in one embodiment. The environment typically includes a source client 210, a content delivery network 240, and an external network 270. The source client is the source of the large data. The source client includes a media source 220 and one or more converters 230. The media source 220 may include cameras, a file server, or some other originating source for large data. The converters 230 encode the data from the media source 220 into a video format supported by the CDN internal network 240. The converters 230 may produce several video files representing zoom levels mapped to video bit rates.

The content delivery network 240, where smooth streaming operates, includes one or more ingest servers 250 and one or more origin servers 260. The ingest servers 250 receive converted media in each of the multiple formats from the converters 230 and create a manifest describing the converted media. The converters 230 may also supply the manifest. The ingest servers 250 may create and store the content parts described herein or may create the parts on the fly as they are requested. The ingest servers 250 can receive pushed data, such as via an HTTP POST, from the converters 230, or via pull by requesting data from the converters 230. The converters 230 and ingest servers 250 may be connected in a variety of redundant configurations. For example, each converter may send encoded media data to each of the ingest servers 250, or only to one ingest server until a failure occurs. The origin servers 260 are the servers that respond to client requests for content parts. The origin servers 260 may also be configured in a variety of redundant configurations.

The external network 270 includes edge servers 280 and other Internet (or other network) infrastructure and clients 290. When a client makes a request for a content part, the client addresses the request to the origin servers 260. Because of the design of network caching, if one of the edge servers 280 contains the data, then that edge server may respond to the client request without passing along the request. However, if the data is not available at the edge server, then the edge server forwards the request to one of the origin servers 260. Likewise, if one of the origin servers 260 receives a request for data that is not available, the origin server may request the data from one of the ingest servers 250.

Figure 3:
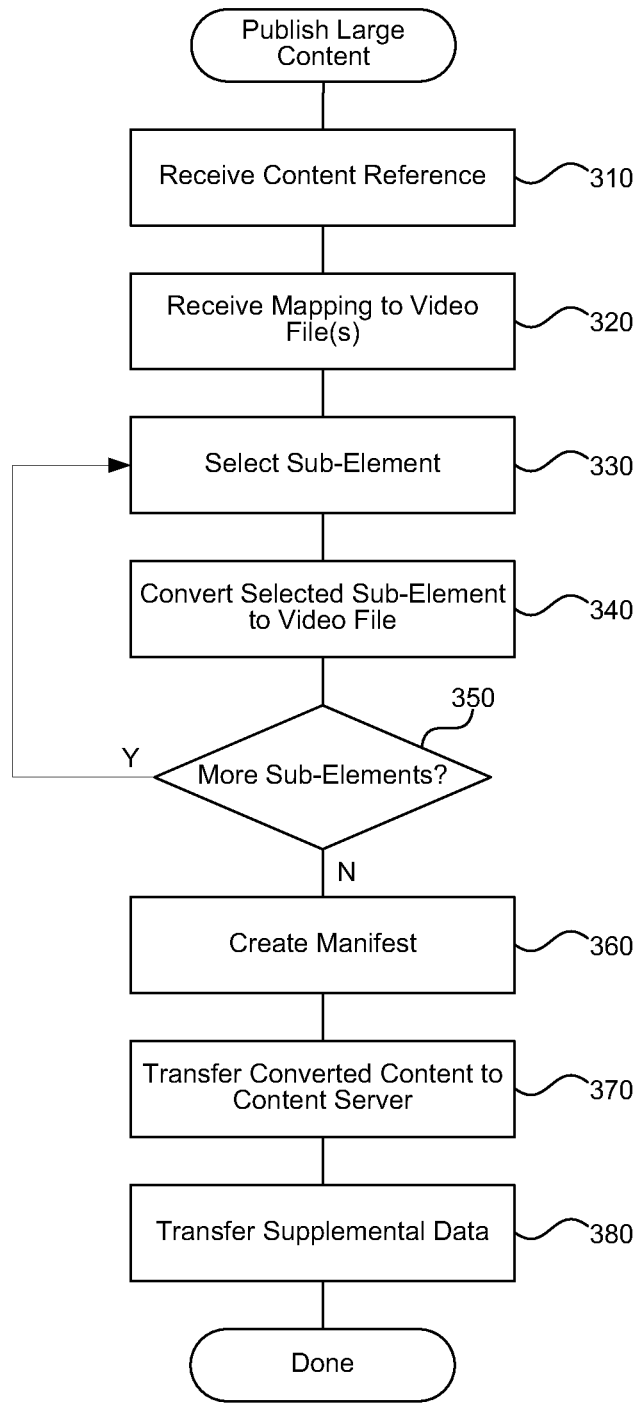
FIG. 3 is a flow diagram that illustrates the publisher-side processing of the content delivery system, in one embodiment.

FIG. 3 is a flow diagram that illustrates the publisher-side processing of the content delivery system, in one embodiment. Beginning in block 310, the system receives a reference to a large content element. For example, a publisher may provide a link to a folder that contains a large image or multiple large images of the same subject at various zoom levels. In some cases, the large image may already be divided into image tiles that when combined in a grid make up the large image. In other cases, the system may identify the image tiles based on the large image. Continuing in block 320, the system receives an indication of the layout of the large content element, including sub-elements of the large content element. A sub-element may include files that correspond to each of multiple zoom levels. For example, the publisher may indicate that a main folder contains a subfolder for each zoom level of images of a subject.

Continuing in block 330, the system selects the first sub-element of the large content element. During subsequent iterations, the system selects the next sub-element. Continuing in block 340, the system converts the selected sub-element into a video format supported by a content server. For example, a content publisher may use tools provided by the system to convert thousands of image tiles into a single file that resembles frames of video. Continuing in decision block 350, if there are more sub-elements, then the system loops to block 330 to select the next element, else the system continues at block 360.

Continuing in block 360, the system creates a manifest describing the received large content element and the indicated layout. The manifest can be passed by the content server to clients that request access to the large content element, and clients can use the manifest to select particular content parts of the large content element to retrieve. Continuing in block 370, the system transfers the converted sub-elements of the large content element as video files to the content server for responding to user requests. For example, the system may upload via FTP or HTTP POST one or more video files created by the conversion process to an ingest server of a CDN. Continuing in block 380, the system may also transfer any supplemental data associated with the converted large content element, such as the created manifest and/or a client application for accessing and displaying the large content element or portions thereof. After block 380, these steps conclude.

Figure 4:
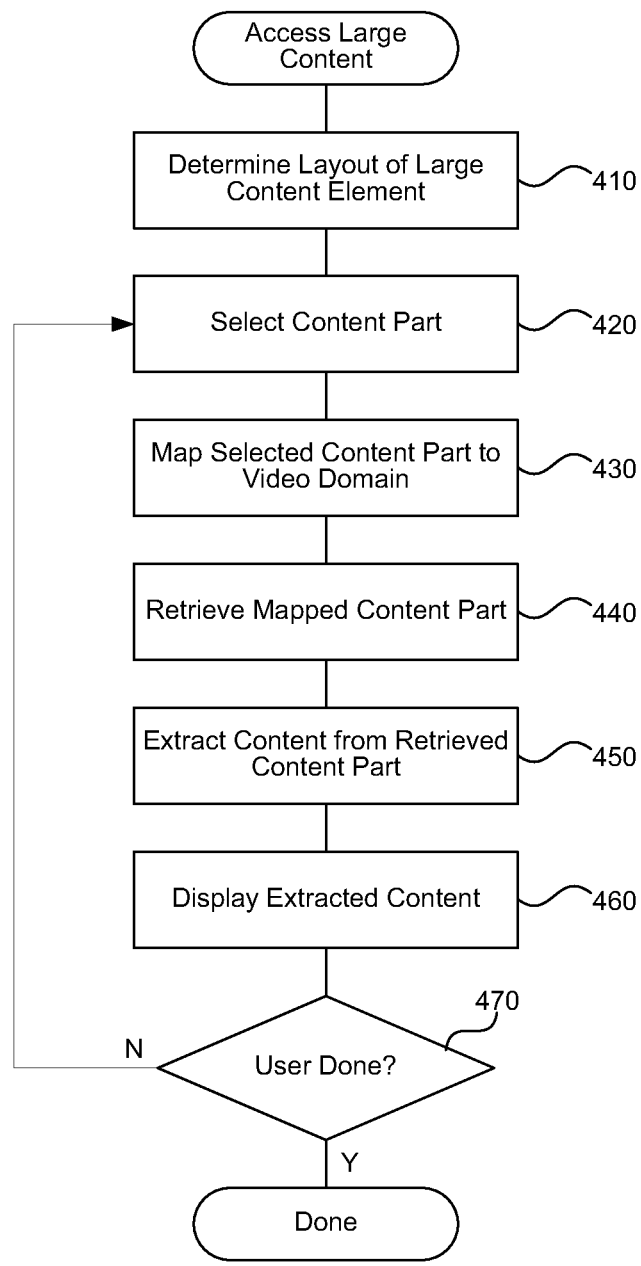
FIG. 4 is a flow diagram that illustrates the client-side processing of the content delivery system to access a large content element, in one embodiment.

FIG. 4 is a flow diagram that illustrates the client-side processing of the content delivery system to access a large content element, in one embodiment. Beginning in block 410, the system determines a layout of a large content element. For example, the client may receive a manifest from a content server describing the large content element and may determine an initial zoom level of the element to display. Continuing in block 420, the system determines a content part of the large content element to select for display. For example, the system may initially display a fully zoomed out version of the large content element, in which one image tile displays a low-resolution version of an entire large image. On subsequent iterations, the system may select a content part based on user interaction, such as receiving a click on a particular portion of the image to which the user wants to zoom. The system may provide a variety of user interface controls through a client application downloaded by the client upon accessing the content. The controls may allow mouse wheel input, clicks, keyboard input, or other input to control display of the content and actions to display subsequent content parts.

Continuing in block 430, the system maps the determined content part to a frame within a converted file associated with the large content element previously uploaded to a content server. For example, the system may convert an X-Y coordinate that identifies an image tile to a time within a video file's timeline. The system may also convert a zoom level of the large content element to a bit rate associated with a particular video file that contains image tiles of the large content element. In some embodiments, the system uses a well-defined conversion from the large content domain to the video domain. For example, the system may generate the video time using Y-position X 1,000,000,000+X-position, and the bit rate/quality level by adding 100 to the zoom level.

Continuing in block 440, the system sends a request to retrieve the mapped frame from the content server and receives the requested frame (from either the content server or a cache between the client and content server). For example, the system may send an HTTP GET request to a well-formed URL for accessing the content part. Continuing in block 450, the system unboxes the received frame to extract the selected content part packaged within the received frame. For example, each frame may store content in a container format, such as an MP4 box, and the system interprets the format to identify the content stored within the container as well as any metadata associated with the content. The client request may request that the content server unbox the content and provide the extracted content to the client. Continuing in block 460, the system displays the extracted content part. For example, if the content is image data, then the system may display the image on a monitor of the client.

Continuing in decision block 470, if a user has completed viewing the content, then the system completes, else the system loops to block 420 to receive a selection of the next content part to retrieve and display. After block 470, these steps conclude.

Figure 5:
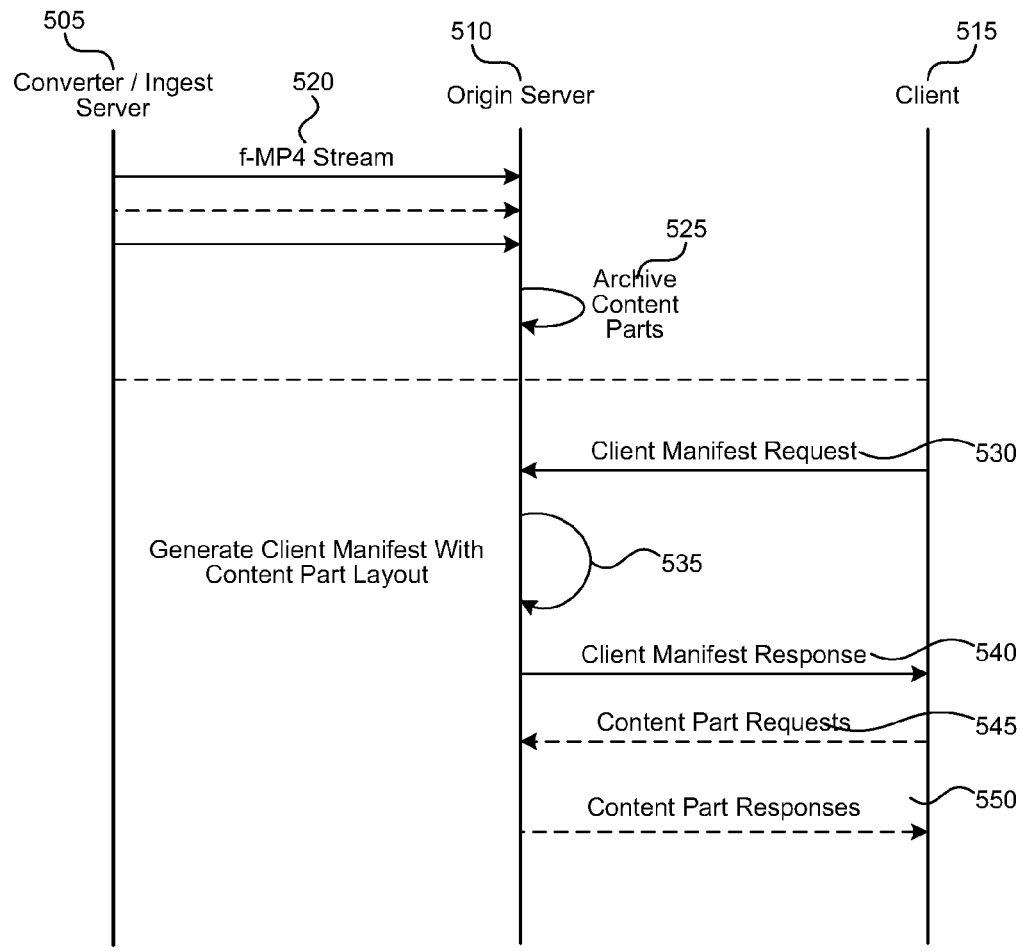
FIG. 5 is a data flow diagram that illustrates the flow of content parts from a converter to an origin server to a client, in one embodiment.

FIG. 5 is a data flow diagram that illustrates the flow of content parts from a converter to an origin server to a client, in one embodiment. The converter 505 provides media data 520 to the origin server 510 either directly or through an ingest server as described herein. The media data may include fragments of an MP4 stream based on a large content item, for example. The origin server 510 archives 525 each media fragment, such as to a local data store. The origin server 510 receives a manifest request 530 from a client 515. The origin server 510 generates 535 a client manifest based on the latest media fragment information (or may pass along a manifest received from the converter 505). The origin server 510 provides a client manifest response 540 to the client 515. The client 515 then sends one or more content part requests 545 to retrieve media fragments, and the origin server 510 responds 550 with the requested media fragment and potentially information about subsequent media fragments. The data flow on the left of the diagram continues for as long as the converter 505 is providing new media data. The data flow on the right of the diagram continues for as long as clients 515 are requesting content parts.

As discussed above, the content delivery system creates a client manifest. Following is an example of a sub-element manifest that describes the layout of a large content element in multiple video files (i.e., bit rates) provided by a content server:

```
<?xml version="1.0" encoding="utf-8"?>
<smil xmlns="http://www.w3.org/2001/SMIL20/Language">
    <head>
        <meta name="clientManifestRelativePath"
content="ball-pngtest.ismc" />
    </head>
    <body>
        <switch>
            <video src="ball-pngtest_00.ismv" systemBitrate="100">
                <param name="trackID" value="1" valuetype="data" />
                <param name="trackName" value="tile" valuetype="data" />
            </video>
            <video src="ball-pngtest_01.ismv" systemBitrate="101">
                <param name="trackID" value="1" valuetype="data" />
                <param name="trackName" value="tile" valuetype="data" />
            </video>
            <video src="ball-pngtest_02.ismv" systemBitrate="102">
                <param name="trackID" value="1" valuetype="data" />
                <param name="trackName" value="tile" valuetype="data" />
            </video>
            <video src="ball-pngtest_03.ismv" systemBitrate="103">
                <param name="trackID" value="1" valuetype="data" />
                <param name="trackName" value="tile" valuetype="data" />
            </video>
            <video src="ball-pngtest_04.ismv" systemBitrate="104">
                <param name="trackID" value="1" valuetype="data" />
                <param name="trackName" value="tile" valuetype="data" />
            </video>
            <video src="ball-pngtest_05.ismv" systemBitrate="105">
                <param name="trackID" value="1" valuetype="data" />
                <param name="trackName" value="tile" valuetype="data" />
            </video>
            <video src="ball-pngtest_06.ismv" systemBitrate="106">
                <param name="trackID" value="1" valuetype="data" />
                <param name="trackName" value="tile" valuetype="data" />
            </video>
            <video src="ball-pngtest_07.ismv" systemBitrate="107">
                <param name="trackID" value="1" valuetype="data" />
                <param name="trackName" value="tile" valuetype="data" />
            </video>
            <video src="ball-pngtest_08.ismv" systemBitrate="108">
                <param name="trackID" value="1" valuetype="data" />
                <param name="trackName" value="tile" valuetype="data" />
            </video>
            <video src="ball-pngtest_09.ismv" systemBitrate="109">
                <param name="trackID" value="1" valuetype="data" />
                <param name="trackName" value="tile" valuetype="data" />
            </video>
            <video src="ball-pngtest_10.ismv" systemBitrate="110">
                <param name="trackID" value="1" valuetype="data" />
                <param name="trackName" value="tile" valuetype="data" />
            </video>
        </switch>
    </body>
</smil>
```

For each video file, the system may also provide a client manifest such as the one shown below.

```
<?xml version="1.0" encoding="utf-8"?>
<Image TileSize="256" Overlap="1" Format="jpg"
    ServerFormat="SmoothStreaming"
```

```
     xmlns="http://schemas.microsoft.com/deepzoom/2009">
       <Size Width="1024" Height="1024" />
  </Image>
```

The client manifest contains information describing the content provided by the content server. In the case of a large image, the client manifest provides information about the tile size, image format (e.g., JPG or PNG), width, height, and so forth. The client uses this information to compose requests for individual tiles using URLs understood by the content server.

In some embodiments, the content delivery system uses digital video recorder (DVR)-like functionality provided by extensions like MICROSOFT IIS smooth streaming. Such extensions allow users to pause a live stream, seek within the live stream, and so forth, without adding work or state tracking for the server. For large content elements mapped to video, this allows random seeking to any content part within the large content element. For example, for a large image, a user can zoom into any part of the image (e.g., corresponding to seeking) or pan around the image (e.g., corresponding to pausing). Based on the assembled manifest described herein, the system offers the user control over how they access a stream. A client application provided by the content delivery system may include logic for switching bit rates (e.g., mapped to zoom levels of an image), seeking, and other video based actions to create a particular effect in a user's experience of a large content element.

In some embodiments, the content delivery system operates by providing the client with a web browser plug-in. For example, the system may provide the client with a MICROSOFT SILVERLIGHT application. MICROSOFT SILVERLIGHT receives references in web pages to applications contained in containers called XAP files. MICROSOFT SILVERLIGHT extracts the XAP file and invokes the application. MICROSOFT SILVERLIGHT provides applications with a sandboxed, secure environment in which to run so that a user's computer system is protected from malicious or erroneous application code. MICROSOFT SILVERLIGHT provides application programming interfaces (APIs) that applications can call to playback media in a way that shields the user's computer system and hardware from potentially harmful application actions. Thus, MICROSOFT SILVERLIGHT and other browser plug-ins can provide all of the functionality of a client environment in which the content delivery system expects to operate.

The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency. Because each content part provided by the content delivery system is accessible at a well-formed URL that is cacheable by Internet cache infrastructure, clients may receive cached data at lower latency without each request going all the way to the content server.

In some embodiments, the content delivery system stores the assembled manifest described herein for later use, such as viewing the large content element offline. While using the system online with a web application, the client may have requested various content parts. The client browser may also contain cached versions of these content parts. If the user requests to view the large content element later, it may be most efficient to attempt to access the content from the local cache, which generally means that the client requests the exact same content parts that were originally retrieved. By storing the manifest with metadata from each content part that was actually received, the client can view the content using the content parts that were requested previously. This may enable the user to access the content in scenarios, such as on an airplane, where connectivity to the origin server may be unavailable.

From the foregoing, it will be appreciated that specific embodiments of the content delivery system have been described herein for purposes of illustration, but that various modifications may be made without deviating from the spirit and scope of the invention. Accordingly, the invention is not limited except as by the appended claims.

We claim:

1. A computer-implemented method for accessing a large, non-video content element stored at a content server, the method comprising:
   determining at a content client layout of the large content element;
   selecting at the content client a content part of the large content element to retrieve for display;
   mapping at the content client the selected content part to a frame within a video file associated with the large content element, wherein the large content element is not video content and the selected content part is not a frame of video but is nevertheless mapped to a from of video for transmission between the content server and content client to leverage content infrastructure optimized for streaming video;
   sending from the content client a request to retrieve the mapped frame from the content server and receiving the requested frame;
   extracting at the content client the received frame to access the selected content part packaged within the received frame; and
   displaying at the content client the extracted content part to a user using client hardware,
   wherein the preceding steps are performed by at least one processor.

2. The method of claim 1 wherein determining the layout comprises receiving a manifest from the content server describing the large content element.

3. The method of claim 1 wherein selecting a content part comprises selecting an initial zoom level of a large image represented by the large content element.

4. The method of claim 1 wherein selecting a content part comprises selecting the content part based on user interaction that selects a portion of a large image to which to zoom in on.

5. The method of claim 1 wherein mapping the selected content part to a frame comprises converting an X-Y coordinate location that identifies an image tile to a time within a video file's timeline.

6. The method of claim 1 wherein mapping the selected content part to a frame comprises converting a zoom level of the large content element to a bit rate associated with a particular video file that contains image tiles of the large content element.

7. The method of claim 1 wherein sending a request to retrieve the mapped frame comprises forming a well-formed URL that identifies the mapped frame to the content server.

8. The method of claim 1 wherein receiving the requested frame comprises receiving the frame from an Internet cache server.

9. The method of claim 1 wherein extracting the received frame comprises interpreting a container format to identify content stored within the container and metadata associated with the content.

10. The method of claim 1 further comprising receiving user input that selects a new content part and repeating the steps of mapping, sending, receiving, and extracting the new content part to display the new content part to the user.

11. A computer system for transferring and accessing large content elements, the system comprising:
- a processor and memory configured to execute software instructions;
- a content conversion component configured to convert a large content element into a video file format for streaming to clients, wherein the large content element is not video content but is nevertheless mapped to one or more frames of video for transmission between a content server and a content client to leverage content infrastructure optimized for streaming video;
- a content transfer component configured to transfer one or more converted video files from a content publisher to the content server;
- an index content component configured to build a client-side index that describes the large content element to which received content parts belong;
- a select content part component configured to receive a selection of a particular content part within the large content element;
- a frame mapping component configured to map the selected content part to a corresponding video frame within the converted large content element;
- a frame request component configured to send requests from the client for individual content parts in the form of video frames from the content server;
- a content extraction component configured to interpret the format of a video frame received by the frame request component and separate a data portion from the frame; and
- a content display component configured to display received media content using client hardware.

12. The system of claim 11 wherein the content conversion component is further configured to convert each image tile that makes up a large image to a video frame based on the image tile's position within the large image.

13. The system of claim 11 wherein the content conversion component is further configured to convert multiple sets of image tiles to video files having different identified bit rates, each set of image tiles representing a different zoom level of a large image.

14. The system of claim 11 wherein the content transfer component is further configured to reduce a number of files transferred to the content server by packaging multiple content files that comprise the large content element into a smaller number of video files.

15. The system of claim 11 wherein the content transfer component is further configured to automatically generate scaled-down, lower resolution image tiles from a large, full-detail image and cache the result to save future processing.

16. The system of claim 11 wherein the content transfer component is further configured to provide instructions as a manifest describing the content to the content server that helps a client to consume the content, wherein the manifest includes information indicating a layout of a large image that allows the client to automatically determine a video time that maps to a particular position within the image without transferring the specific time associated with each image tile associated with the large image.

17. The system of claim 11 further comprising a client application transfer component configured to upload a client application to the content server for clients to retrieve, wherein the client application includes processing instructions designed to retrieve and extract the large content from the converted format.

18. The system of claim 11 wherein the frame mapping component is further configured to determine that a content part representing an image tile at a given X and Y coordinate position maps to a time T in a video representation of the large content element to which the image tile belongs.

19. A computer-readable storage medium comprising instructions for controlling a computer system to publish a large content element formatted as video data, wherein the instructions, when executed, cause a processor to perform actions comprising:
- receiving at a content publisher reference to the large content element, wherein the large content element is not video content but is nevertheless mapped to one or more frames of video for transmission between the content server and a content client to leverage content infrastructure optimized for streaming video;
- receiving at the content publisher an indication of a layout of the large content element, including sub-elements of the large content element;
- converting at the content publisher each sub-element into a video format supported by a content server;
- creating at the content publisher a manifest describing the received large content element and the indicated layout; and
- transferring at the content publisher the converted sub-elements of the large content element as video files to the content server for responding to content client requests.

20. The medium of claim 19 further comprising transferring supplemental data associated with the converted large content element including the created manifest and a client application for accessing and displaying at least some portions of the large content element.

* * * * *